US010674757B2

(12) United States Patent
Normand et al.

(10) Patent No.: US 10,674,757 B2
(45) Date of Patent: Jun. 9, 2020

(54) PREPARATION OF DRIED PARTICLES COMPRISING MENTHOL

(71) Applicants: FIRMENICH SA, Satigny (CH); Kyle Subramaniam, Hightstown, NJ (US)

(72) Inventors: Valery Normand, Plainsboro, NJ (US); Alison Rada, Plainsboro, NJ (US); Amanda Schober, Plainsboro, NJ (US); Anandaraman Subramaniam, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 0 days.

(21) Appl. No.: 14/900,612

(22) PCT Filed: May 28, 2014

(86) PCT No.: PCT/EP2014/061051
§ 371 (c)(1),
(2) Date: Dec. 21, 2015

(87) PCT Pub. No.: WO2014/202364
PCT Pub. Date: Dec. 24, 2014

(65) Prior Publication Data
US 2016/0165937 A1     Jun. 16, 2016

Related U.S. Application Data

(60) Provisional application No. 61/837,849, filed on Jun. 21, 2013.

(51) Int. Cl.
*A23L 27/10*     (2016.01)
*A23P 10/47*     (2016.01)
*A23L 29/25*     (2016.01)
*A23L 27/00*     (2016.01)
*A23L 29/10*     (2016.01)

(52) U.S. Cl.
CPC ............... *A23P 10/47* (2016.08); *A23L 27/10* (2016.08); *A23L 27/80* (2016.08); *A23L 29/10* (2016.08); *A23L 29/25* (2016.08)

(58) Field of Classification Search
CPC .......... A23L 27/10; A23L 27/80; A23L 29/10; A23L 29/25
See application file for complete search history.

(56) References Cited

U.S. PATENT DOCUMENTS

| 4,276,312 | A | * | 6/1981 | Merritt | A23L 27/72 |
| | | | | | 426/471 |
| 6,537,595 | B1 | * | 3/2003 | Hyodo | A23G 3/2092 |
| | | | | | 426/3 |
| 2003/0124228 | A1 | | 7/2003 | Goto et al. | |
| 2006/0159818 | A1 | * | 7/2006 | Kunieda | A23L 27/204 |
| | | | | | 426/534 |
| 2007/0116837 | A1 | * | 5/2007 | Prakash | A23L 2/60 |
| | | | | | 426/548 |
| 2008/0044551 | A1 | * | 2/2008 | Subramaniam | A23G 4/06 |
| | | | | | 426/650 |
| 2008/0102131 | A1 | * | 5/2008 | Nagira | A61K 9/113 |
| | | | | | 424/489 |
| 2009/0004304 | A1 | * | 1/2009 | Ikehara | A61K 9/1075 |
| | | | | | 424/736 |
| 2010/0034956 | A1 | * | 2/2010 | Yasumi | A61K 9/1623 |
| | | | | | 426/648 |
| 2011/0026760 | A1 | | 2/2011 | Martiska et al. | |
| 2011/0059205 | A1 | * | 3/2011 | Gaysinsky | A23G 4/068 |
| | | | | | 426/66 |
| 2012/0083530 | A1 | * | 4/2012 | Mai | A61K 9/0095 |
| | | | | | 514/560 |
| 2012/0231122 | A1 | * | 9/2012 | Tran | A23P 10/30 |
| | | | | | 426/103 |
| 2012/0322750 | A1 | * | 12/2012 | Schrader | A23L 2/385 |
| | | | | | 514/25 |
| 2013/0004615 | A1 | * | 1/2013 | Bouquerand | A23L 23/00 |
| | | | | | 426/3 |
| 2013/0022728 | A1 | * | 1/2013 | Popplewell | A23L 27/20 |
| | | | | | 426/535 |
| 2014/0193562 | A1 | * | 7/2014 | Popplewell | A23L 2/56 |
| | | | | | 426/535 |
| 2014/0205688 | A1 | * | 7/2014 | Takahashi | A23L 2/56 |
| | | | | | 424/734 |
| 2015/0374018 | A1 | * | 12/2015 | Normand | A23L 1/22008 |
| | | | | | 705/7.11 |

FOREIGN PATENT DOCUMENTS

| JP | 2004035802 A | 2/2004 |
| WO | WO2006/082536 A1 | 8/2006 |
| WO | WO2011/121468 A1 | 10/2011 |

OTHER PUBLICATIONS

Tsai, M. et al, "Chemical Composition and Biological Properties of Essential Oils of Two Mint Species", Tropical Journal of Pharmaceutical Research, Aug. 2013; 12 (4): 577-582.*
International Food Information Service. (2009). Dictionary of Food Science and Technology (2nd Edition). International Food Information Service (IFIS Publishing). p. 353-354.*
International Search Report and Written Opinion, application PCT/EP2014/061051, dated Jul. 23, 2014.

* cited by examiner

*Primary Examiner* — Nikki H. Dees
(74) *Attorney, Agent, or Firm* — Armstrong Teasdale LLP

(57) ABSTRACT

Provided herein are emulsions and particles comprising high concentration of menthol. Also provided is a process for the preparation emulsions and dried particles comprising high concentration of menthol, Gum Arabic and a natural extract comprising saponins.

13 Claims, 3 Drawing Sheets

PREPARATION OF DRIED PARTICLES COMPRISING MENTHOL

TECHNICAL FIELD

The technical field relates to emulsions and dried particles comprising a high concentration of menthol.

BACKGROUND

Formulations comprising high concentrations of menthol are commercially available. Stable formulations (e.g., free flowing powders) may be formed in some situations at high cost and in some cases with the use of materials that are not considered "natural" for example by governmental regulatory agencies. Hence it is desirable to achieve stable formulations at low cost and/or made with materials that qualify as "natural." Spray drying is employed by the flavor industry to render liquid, generally hydrophic flavors into a dry free-flowing powder form. In spray-dried powders, an active ingredient such as a flavor or a fragrance, usually hydrophobic, is entrapped as liquid droplets in a solidified matrix of a dehydrated carrier, generally consisting of carbohydrates, such as starches, hydrolyzed starches, chemically modified starches, emulsifying polymers and in certain instances monomers and dimers of simple aldohexoses, or any combination thereof. Conventional spray-drying techniques are described for example in Spray-Drying Handbook, 4$^{th}$ ed., K. Masters, (1985) or other reference books on the subject-matter.

SUMMARY

Provided herein is an emulsion comprising water and:
a) from about 38 to about 61% menthol, by weight, of the total weight of the emulsion excluding the weight of the water;
b) from about 39 to about 62% of a Gum Arabic comprising *Acacia seyal*, by weight, of the total weight of the emulsion excluding the weight of the water;
c) from about 0.06 to about 0.22%, by weight of a dried extract comprising a saponin, of the total weight of the emulsion excluding the weight of water; wherein the water is provided in an amount of about 45% to about 50% by weight of the total weigh of the emulsion.

Further provided here is dried particle comprising:
a) from about 30 to about 55% menthol, by weight, of the total weight of the particle;
b) from about 45 to about 70% of a Gum Arabic comprising *Acacia seyal*, by weight, of the total weight of the particle; and
c) about 0.06 to about 0.22%, by weight of a dried extract, of the total weight of the particle.

DETAILED DESCRIPTION

Figure 1:
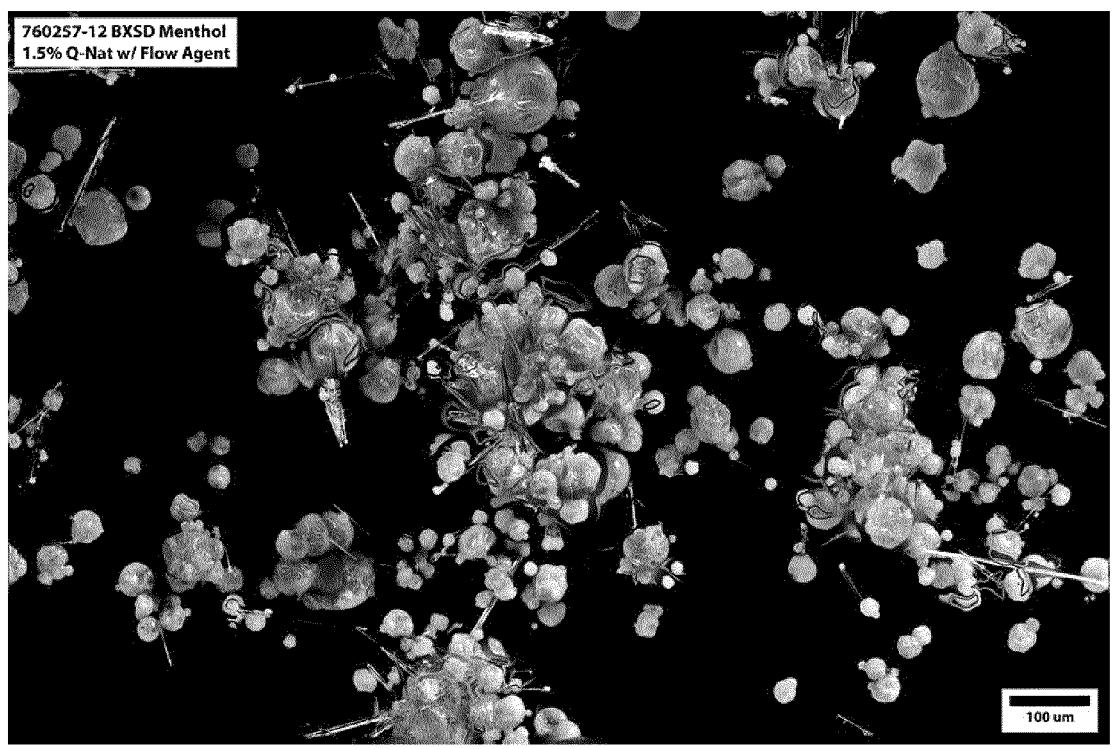
FIG. 1 shows a micrograph of capsules loaded at 43.2% w/w in menthol with high menthol surface concentration (needles like menthol crystals).

For the descriptions herein and the appended claims, the use of "or" means "and/or" unless stated otherwise. Similarly, "comprise," "comprises," "comprising" "include," "includes," and "including" are interchangeable and not intended to be limiting.

Further provided herein are particles having about 35% menthol. Yet further provided herein is a particle having about 50% menthol.

It is to be further understood that where descriptions of various embodiments use the term "comprising," those skilled in the art would understand that in some specific instances, an embodiment can be alternatively described using language "consisting essentially of" or "consisting of."

Further provided herein is a particle that is free flowing. Further provided is a particle having an avalanche energy times an untapped bulk density of maximum 439.5 Pa·s·g/cc·kg; the log of which is about 2.65. Hence, also provided herein is a free flowing powder having a log of (the avalanche energy times an untapped bulk density) equal to or less that about 2.65 (Log of the granular sugar avalanche energy times untapped bulk density). Granular sugar is used as a reference for good flowability. Further provided is a uniform granular system with no lumps. The avalanche energy (AvE) is measured using a revolution powder analyzer (US 2011/0026760 A1) and the bulk untapped density is measured by weighing 100 cc powder.

While not wishing to be bound to any theory, it is believed that surface menthol is prone to crystallize whereas encapsulated menthol is not. It is believed that the surface menthol may interfere with the flow characteristics of the particles provided herein. To investigate the effect of surface oil on the flowability, it is here considered that the avalance energy is inversely proportional to the bulk density of the powder, which itself depends on the powder's constituents. Generally, the higher the loading, the lower the density. Therefore, multiplying the avalanche energy and the bulk density allows comparison between different nominal loadings.

Saponins are amphiphilic glycosides composed of one or more hydrophilic glucoside moiety combined with a lipophilic triterpene derivative. Saponins are present in diverse plant extracts. As "natural extract comprising saponins" it is meant here any saponin or mixture of substances comprising saponins obtained by applying a physical separation process to a raw material that is available in nature. Preferred natural extracts are those comprising at least 10% by weight, more preferably at least 20% by weight, even more preferably at least 50% by weight, most preferably at least 80% by weight, relative to the total weight of the extract, of saponins.

Examples of natural extracts that can be used in the present invention, are plant extracts, such as quillaj a extract, camellia seeds extract, achyranthe extract, glycyrrhizine and stevia. *Quillaja* extract, which is obtained from the bark of *Quillaja saponaria* is particularly appreciated for the purpose of the present invention. Such plant extracts are commercially available from diverse suppliers. For example, *quillaja* extract can be purchased in a dilute form from Ingredion under the trade name Q-Naturale™ (*Quillaja* extract in water).

An emulsion provided herein may also contain optional ingredients. It may in particular further contain an effective amount of a fireproofing or explosion suppression agents. The type and concentration of such agents in spray-drying emulsions is known to the person skilled in the art. One can cite as non-limiting examples of such fireproofing or explosion suppression agents inorganic salts, $C_1$-$C_{12}$ carboxylic acids, salts of $C_1$-$C_{12}$ carboxylic acids and mixtures thereof. Preferred explosion suppression agents are, salicylic acid, acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, tartaric acid, ascorbic acid, the potassium, calcium and/or sodium slats of any of the afore-mentioned acids, and mixtures of any of these. Other optional ingredients include antioxidants, colorants and dyes.

The emulsion can be formed using any known emulsifying method, such as high shear mixing, sonication or homogenization. Such emulsifying methods are well known to the person skilled in the art.

In one embodiment, the droplet size d(v,0.9) of the emulsion is preferably comprised between 1 and 15 µm, more preferably between 1 and 10 µm and even more preferably between 1 and 6 µm. More particularly, the droplet size remains within such range for at least one day storage at ambient temperature (25° C.).

The viscosity of the emulsion is preferably comprised between 20 and 300 mPas, more preferably between 70 and 200 mPas and even more preferably between 100 and 150 mPas at the temperature at which the atomization step, as defined below, is carried out.

The spray-drying process comprises two steps, the first one being dispersion and the second one being drying.

The emulsion is first subjected to an atomization step, during which the emulsion is dispersed in the form of drops into a spraying tower. Any device capable of dispersing the emulsion in the form of drops can be used to carry out such dispersion. For instance, the emulsion can be guided through a spraying nozzle or through a centrifugal wheel disk into the spraying tower. Vibrated orifices may also be used.

The method for the preparation of a spray-dried powder typically first comprises the dispersion of a carrier in water, and then the mixture of this dispersion with a flavor before homogenization to form an oil-in-water emulsion. The emulsion is then spray-dried to produce a powdered flavor.

The size of particles is determined by the size of the drops that are dispersed into the tower. If a spraying nozzle is used for dispersing the drops the size may be controlled by the flow rate of an atomising gas through the nozzle, for example. In the case where a centrifugal wheel disk is used for dispersal, the main factor for adjusting droplet size is the centrifugal force with which the drops are dispersed from the disk into the tower. The centrifugal force, in turn, depends on the speed of rotation and the diameter of the disk. The feed flow rate of the emulsion, its surface tension and its viscosity are also parameters controlling the final drop size and size distribution. By adjusting these parameters, the skilled person can control the size of the drops of the emulsion to be dispersed in the tower.

Once sprayed in the chamber, the droplets are dried using any technique known in the art. These methods are perfectly documented in the patent and non-patent literature in the art of spray-drying. For example, Spray-Drying Handbook, $3^{rd}$ ed., K. Masters; John Wiley (1979), describes a wide variety of spray-drying methods.

The process of the present invention may be performed in any conventional spraying tower. A conventional multi-stage drying apparatus is for example appropriate for conducting the steps of this process. It may comprise a spraying tower, and, at the bottom of the tower, a fluidised bed intercepting partially dried particles after falling through the tower.

In one embodiment provided herein, the size of the particles is typically comprised between 10 and 200 µm, more preferably between 50 and 100 µm, even more preferably from 75 to 85 µm.

In another aspect, the invention relates to a food product comprising the dried particles of the invention. The food product of the invention preferably is a particulate or powdery food. In such a case, the dried particles of the invention may easily be added thereto by dry-mixing.

The products of the invention, namely the spray-dried powder as such, as well as the spray-dried compositions further subjected to a second kind of encapsulation can be advantageously used for instance for the perfuming or flavoring of food compositions in particular.

Further provided herein is a food product comprising the particles described herein. Particularly provided herein is a food products selected from the group consisting of chewing gums or chewing sweets, chewing tablets, savory foods, sauces or baked goods. Sauces to impart a menthol flavor are also contemplated herein. Also provided herein is a food product selected from the group consisting of an instant soup, instant sauce, or an effervescent tablet.

Similarly the field of perfumery comprises many applications where this kind of encapsulation systems may be very useful, particularly for detergents in tablet form.

The concentrations in which the microcapsules of the invention can be incorporated in the consumer products vary in a wide range of values, which are dependent on the nature of the product to be perfumed or flavored. Typical concentrations, to be taken strictly by way of example, are comprised in a range of values as wide as from a few ppms up to 5 or 10% of the weight of the flavoring or perfuming composition or finished consumer product into which they are included.

The following examples are illustrative only and are not meant to limit the scope of invention as set forth in the Summary, Description or in the Claims.

EXAMPLES

Example 1

Six samples were made using *Acacia seyal* Gum Arabic
Analytical:
Revolution Powder Analyzer:—Mercury Scientific Company:—Testing avalanche energy Clevenger Distillation Apparatus:—Total menthol determination
GC-MS Analysis (Internal Standard Method):—Surface menthol determination. All samples were analysed to determine the total menthol as well as surface menthol (hexane extractable) contents.
Sample A A solution containing the following ingredients and their amounts were made:

| | |
|---|---|
| Menthol | 3500 grams |
| Gum Arabic | 65 00 grams |
| Water | 8726.6 grams |

The Gum Arabic was dissolved in water at 160° F. (71° C.) for 6 to 8 minutes under agitation prior to addition of menthol. The emulsion was homogenized using a "GEA NIRO SOAVI" high pressure homogenizer (pressures $1^{st}$ stage/$2^{nd}$ stage=4000/500 PSI).
Dried on a pilot tower dryer ($T_{in}$=360° F. (182° C.), $T_{out}$=160° F. (71° C.), Nozzle=68/216 Nozzle diameter=0.78 mm, Feed pressure=1500-2000 PSI)

The measured characteristics of the powder:

| | |
|---|---:|
| Total Menthol using Clevenger distillation apparatus | 31.05% |
| Surface Menthol using GC-MS analysis with Internal standard method | 1.24% |
| Avalanche Energy using Revolution powder analyzer | 1471.8 Pa · s/Kg |
| Bulk Untapped Density: | 0.464 g/cc |

Sample B

A solution containing the following ingredients was made:

| | | |
|---|---:|---|
| Menthol | 3500 | grams |
| Gum Arabic | 6471.5 | grams |
| Q-Naturale ™ | 28.5 | grams |
| Water | 8726.6 | grams |

The Gum Arabic was dissolved in water at 160° F. (71° C.) for 6 to 8 minutes prior to addition of Q-Naturale and subsequently the menthol. The emulsion was homogenized using a "GEA NIRO SOAVI" high pressure homogenizer (pressures $1^{st}$ stage/$2^{nd}$ stage=4000/500 PSI). Dried on a pilot tower dryer ($T_{in}$=360° F. (182° C.), $T_{out}$=160° F. (71° C.), Nozzle=68/216, Nozzle diameter=0.78 mm, Feed pressure=1500-2000 PSI)

The measured characteristics of the powder:

| | |
|---|---:|
| Total Menthol using Clevenger distillation apparatus | 31.05% |
| Surface Menthol using GC-MS analysis with Internal standard method | 0.49% |
| Avalanche Energy using Revolution powder analyzer | 331 Pa · s/Kg |
| Bulk Untapped Density: | 0.5311 g/cc |

Sample C

A solution containing the following ingredients is made:

| | | |
|---|---:|---|
| Menthol | 3500.0 | grams |
| Gum Arabic | 6471.5 | grams |
| Q-Naturale ™ | 28.5 | grams |
| Water | 10725.4 | grams |

Water at 160° F. (71° C.) and Q-Naturale™ were mixed until uniform (1 min) Menthol was added and the emulsion was homogenized using a "GEA NIRO SOAVI" high pressure homogenizer (pressures $1^{st}$ stage/$2^{nd}$ stage=4000/500 PSI). Gum Arabic was added last and dissolved prior to drying.
Dried on a pilot tower dryer ($T_{in}$=360° F. (182° C.), $T_{out}$=160° F. (71° C.), Nozzle=68/216, Nozzle diameter=0.78 mm, Feed pressure=1500-2000 PSI)

The measured characteristics of the powder:

| | |
|---|---:|
| Total Menthol using Clevenger distillation apparatus | 30.15% |
| Surface Menthol using GC-MS analysis with Internal standard method | 0.35% |
| Avalanche Energy using Revolution powder analyzer | 207.6 Pa · s/Kg |
| Bulk Untapped Density: | 0.5489 g/cc |

Best flowability is indicated by a low Avalanche Energy times Bulk untapped density. Granular Sucrose has an avalanche energy of 514 Pa·s/Kg and a bulk untapped density of 0.855 g/cc. Granular sucrose is used as a reference here.

Surface menthol is detrimental to the flowability of the product which is depicted by the correlation between avalanche energy and surface menthol for the same particle size distribution.

The Avalanche Energy is proportional to the square of the surface menthol concentration measured, which indicates that the avalanche energy is a surface phenomenon Sample D A solution containing the following ingredients was made:

| | |
|---|---|
| Menthol | 5000 grams |
| Gum Arabic | 4850 grams |
| Q-Naturale ™ | 150 grams |
| Water | 5500 grams |

The Gum Arabic was dissolved in water at 160° F. (71° C.) for 6 to 8 minutes prior to addition of Q-Naturale and subsequently the menthol. The emulsion was homogenized using a "GEA NIRO SOAVI" high pressure homogenizer (pressures $1^{st}$ stage/$2^{nd}$ stage=4000/500 PSI). Dried on a pilot tower dryer ($T_{in}$=360° F. (182° C.), $T_{out}$=160° F. (71° C.), Nozzle=68/216, Nozzle diameter=0.78 mm, Feed pressure=1500-2000 PSI)

The measured characteristics of the powder:

| | |
|---|---:|
| Total Menthol using Clevenger distillation apparatus | 43.2% |
| Surface Menthol using GC-MS analysis with Internal standard method | 9.00% |
| Avalanche Energy using Revolution powder analyzer | 3030.2 Pa · s/Kg |
| Bulk Untapped Density: | 0.1938 g/cc |

FIG. 1 shows that this sample has high menthol surface concentration visible as needle like crystals. This sample had poor flow properties (e.g., lumps were observed). The sample was characterized as having a high avalanche energy.

Sample E

A solution containing the following ingredients was made:

| | |
|---|---|
| Menthol | 5000 grams |
| Gum Arabic | 4900 grams |
| Q-Naturale ™ | 100 grams |
| Water | 5500 grams |

The Gum Arabic was dissolved in water at 160° F. (71° C.) for 6 to 8 minutes prior to addition of Q-Naturale and subsequently the menthol. The emulsion was homogenized using a "GEA NIRO SOAVI" high pressure homogenizer (pressures $1^{st}$ stage/$2^{nd}$ stage=4000/500 PSI).
Dried on a pilot tower dryer ($T_{in}$=360° F. (182° C.), $T_{out}$=160° F. (71° C.), Nozzle=68/216, Nozzle diameter=0.78 mm, Feed pressure=1500-2000 PSI)

The measured characteristics of the powder:

| | |
|---|---:|
| Total Menthol using Clevenger distillation apparatus | 46.2% |
| Surface Menthol using GC-MS analysis with Internal standard method | 3.40% |

-continued

| | |
|---|---|
| Avalanche Energy using Revolution powder analyzer | 1719.62 Pa · s/Kg |
| Bulk Untapped Density: | 0.2162 g/cc |

Sample F

A solution containing the following ingredients was made:

| | |
|---|---|
| Menthol | 5000 grams |
| Gum Arabic | 4940 grams |
| Q-Naturale ™ | 60 grams |
| Water | 5500 grams |

The Gum Arabic was dissolved in water at 160° F. (71° C.) for 6 to 8 minutes prior to addition of Q-Naturale and subsequently the menthol. The emulsion was homogenized using a "GEA NIRO SOAVI" high pressure homogenizer (pressures $1^{st}$ stage/$2^{nd}$ stage=4000/500 PSI).
Dried on a pilot tower dryer ($T_{in}$=360° F. (182° C.), $T_{out}$=160° F. (71° C.), Nozzle=68/216, Nozzle diameter=0.78 mm, Feed pressure=1500-2000 PSI)

The measured characteristics of the powder:

| | |
|---|---|
| Total Menthol using Clevenger distillation apparatus | 43.8% |
| Surface Menthol using GC-MS analysis with Internal standard method | 1.30% |
| Avalanche Energy using Revolution powder analyzer | 1686.34 Pa · s/Kg |
| Bulk Untapped Density: | 0.2152 g/cc |

Figure 2:
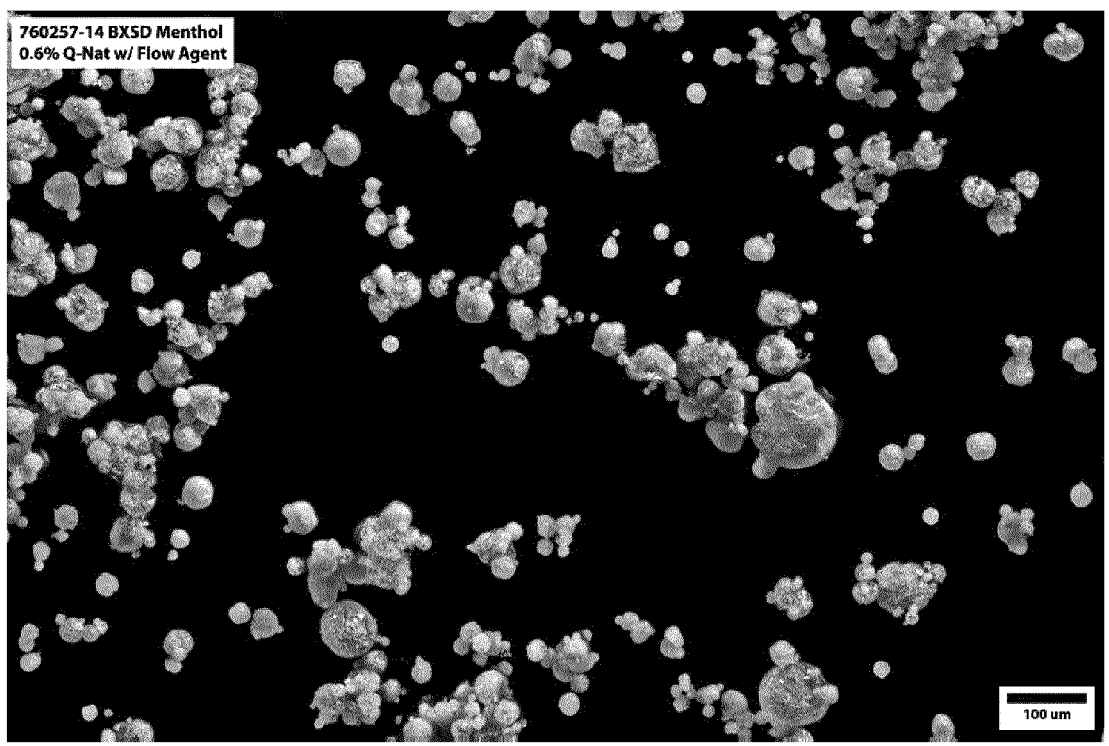
FIG. 2 shows a micrograph of capsules loaded at 43.8% w/w in menthol with low menthol surface concentration.

FIG. 2 shows that this sample has low menthol surface concentration with no visible needle like crystals. This sample had good observed flow properties and was characterized by a low avalanche energy.

Figure 3:
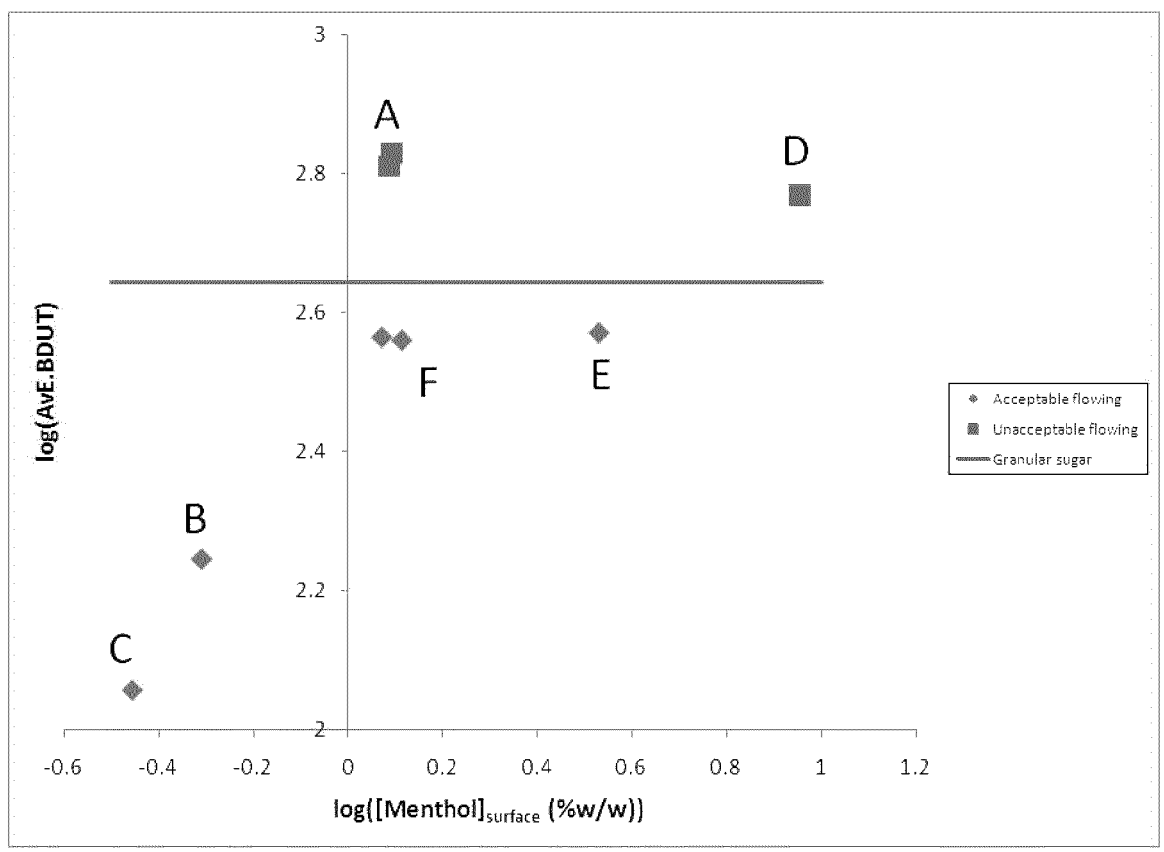
FIG. 3 shows the log of bulk density (untapped) times the avalanche energy (Pa·s·g/cc·kg) for samples made herein plotted against the log of the surface menthol (% wt/wt) for the samples.

The log of the bulk density (untapped) times the avalanche energy (Pa·s·g/cc·kg) for all samples was plotted against the log of the surface menthol (% wt/wt) and is displayed in FIG. 3. This shows that samples B,C, E, and F have good flow properties (e.g., he log of the bulk density (untapped) times the avalanche energy (Pa·s·g/cc·kg) is less than about 2.65 (the value for granular sugar).

What is claimed is:

1. A free-flowing, lump-free, spray-dried flavor particle consisting of:
   a) from about 30 to about 55% menthol, by weight, of the total weight of the particle;
   b) from about 45 to about 70% of a Gum Arabic comprising *Acacia seyal*, by weight, of the total weight of the particle; and
   c) about 0.06 to no more than 0.22%, by weight of a dried plant extract, of the total weight of the particle, wherein the plant extract contains at least 10% by weight of saponins, relative to the total weight of the plant extract;
   wherein the flavor particle has a particle size of between 10 and 200 μm and a value for the log of an avalanche energy times an untapped bulk density that is equal to or less than about 2.65.

2. A free-flowing, lump-free, spray-dried flavor particle consisting of:
   a) from about 30 to about 55% menthol, by weight, of the total weight of the particle;
   b) from about 45 to about 70% of a Gum Arabic comprising *Acacia seyal*, by weight, of the total weight of the particle; and
   c) about 0.06 to no more than 0.22%, by weight of a dried plant extract, of the total weight of the particle, wherein the plant extract is quillaja extract and contains at least 10% by weight of saponins, relative to the total weight of the plant extract;
   wherein the flavor particle has a particle size of between 10 and 200 μm and a value for the log of an avalanche energy times an untapped bulk density that is equal to or less than about 2.65.

3. The particle as recited in claim 2 wherein the plant extract contains at least 20% by weight of saponins, relative to the total weight of the plant extract.

4. A food product comprising an edible material and flavor particles according to any one of claims 2 and 3.

5. An emulsion comprising water and the flavor particles according to any one of claims 2 and 3, wherein the water is provided in an amount of about 45% to about 50% by weight of the total weight of the emulsion.

6. The particle as recited in claim 2 wherein the flavor particle has a particle size of between 50 and 100 μm.

7. The particle as recited in claim 2 wherein the flavor particle has a particle size of between 75 and 85 μm.

8. The particle as recited in claim 2 wherein the plant extract comprises at least 50% by weight of saponins, relative to the total weight of the plant extract.

9. The particle as recited in claim 2 wherein the plant extract comprises at least 80% by weight of saponins, relative to the total weight of the plant extract.

10. A free-flowing, lump-free, spray-dried flavor particle consisting of:
    a) from about 30 to about 55% menthol, by weight, of the total weight of the particle;
    b) from about 45 to about 70% of *Acacia seyal* Gum Arabic, by weight, of the total weight of the particle; and
    c) about 0.06 to no more than 0.22%, by weight of a dried quillaja extract that contains at least 50% by weight of saponins, relative to the total weight of the extract;
    wherein the flavor particle has a particle size of between 50 and 100 μm and a value for the log of an avalanche energy times an untapped bulk density that is equal to or less than about 2.65.

11. The particle as recited in claim 10 wherein the flavor particle has a particle size of between 75 and 85 μm and the extract comprises at least 80% by weight of saponins, relative to the total weight of the extract.

12. A food product comprising an edible material and flavor particles according to claim 10.

13. An emulsion comprising water and the flavor particles according to claim 10, wherein the water is provided in an amount of about 45% to about 50% by weight of the total weight of the emulsion.

* * * * *